United States Patent [19]

Armond et al.

[11] Patent Number: 4,989,376
[45] Date of Patent: Feb. 5, 1991

[54] CONTROL MECHANISM FOR ADVANCING PARTS OF A MACHINE TOOL

[75] Inventors: Joseph A. Armond, River Grove; Juanito Rodenas, Carol Stream; John F. Sepot, Franklin Park, all of Ill.

[73] Assignee: Electro-Matic Products Co., Chicago, Ill.

[21] Appl. No.: 349,845

[22] Filed: May 10, 1989

[51] Int. Cl.$^5$ .............................................. B24B 49/00
[52] U.S. Cl. ............................... 51/165.71; 51/165.77; 51/165.8; 51/166 MH; 51/233
[58] Field of Search ............. 51/165.71, 165.77, 165.8, 51/166, 166 MH, 233, 32, 34 R, 34 C, 34 E, 44, 45, 59 R, 64, 67, 72 R, 91 R, 92 R, 95 R, 103 R, 105 R, 106 R

[56] References Cited

U.S. PATENT DOCUMENTS 4,643,622  2/1987  Winski ............................. 51/165.71

Primary Examiner—Frederick R. Schmidt
Assistant Examiner—M. Rachuba
Attorney, Agent, or Firm—Paul H. Gallagher

[57] ABSTRACT

An electronic encoder is driven by the cross shaft in the grinder that moves the grinder. The encoder includes a rotary disc constantly driven by the cross shaft, forwardly and rearwardly. Associated with the encoder is an electronic counter in which counting functions are performed in response to the rotation of the disc. An electrical circuit incorporates the encoder and counter, and the electronic circuits of the latter, and includes terminals in common with the encoder and counter. Control signals are entered so that functions are performed according to the position of the grinding wheel, and to move the grinding wheel. The encoder is mechanically connected with the cross shaft in an add-on arrangement. A hydraulic motor drives the cross shaft through a motion transmitting component that includes a hydraulic unit and a mechanical unit in tandem. The entire apparatus is retrofitted, and has mechanical driving connection with the grinder only through the cross shaft. The apparatus is made up of separate units each of which can be packed in an individual package.

17 Claims, 12 Drawing Sheets

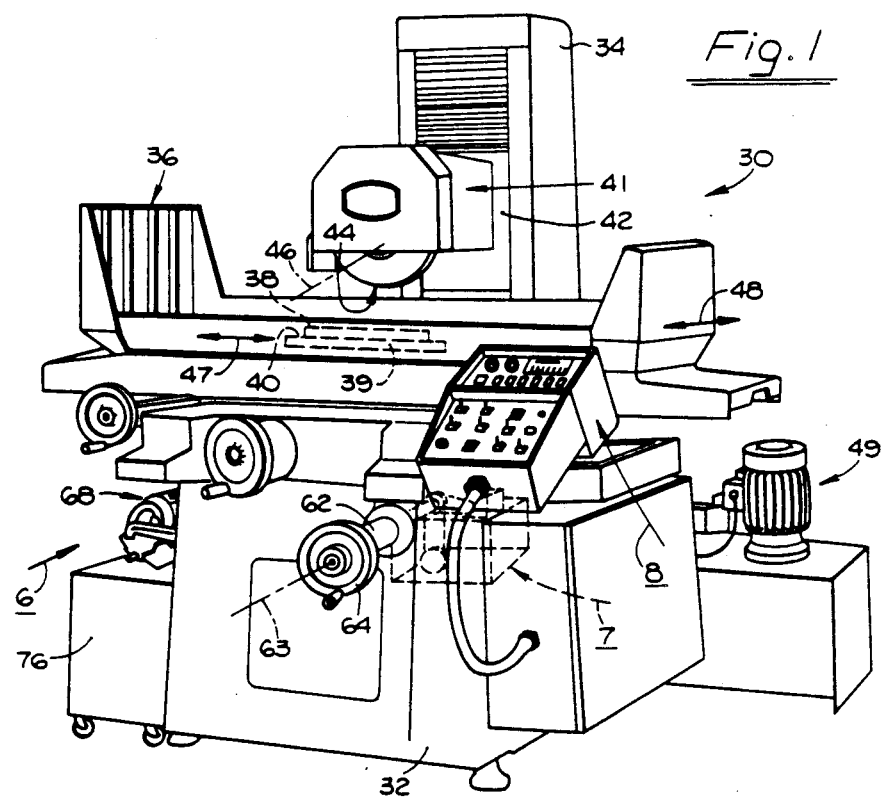
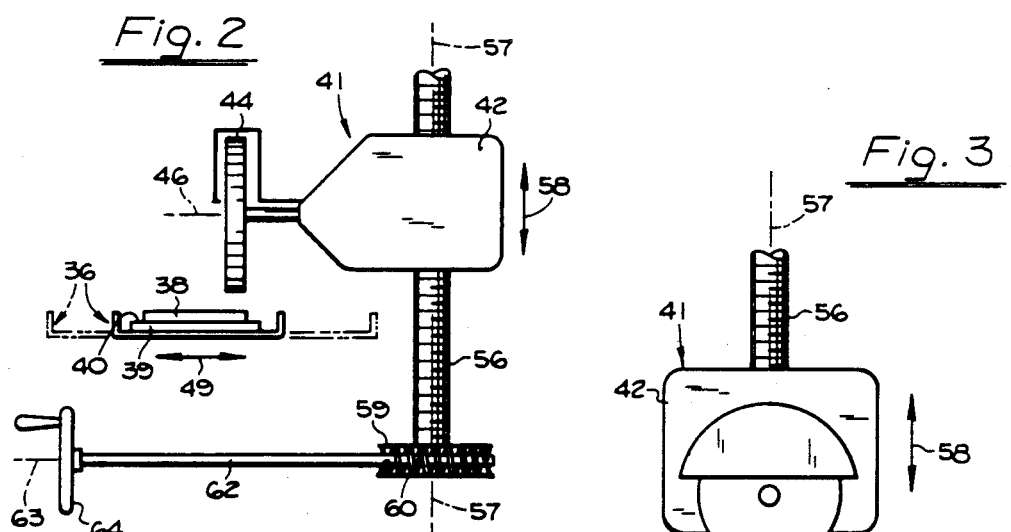
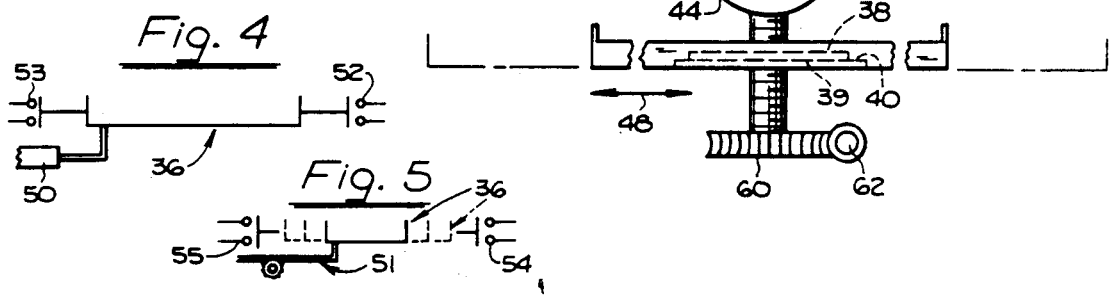

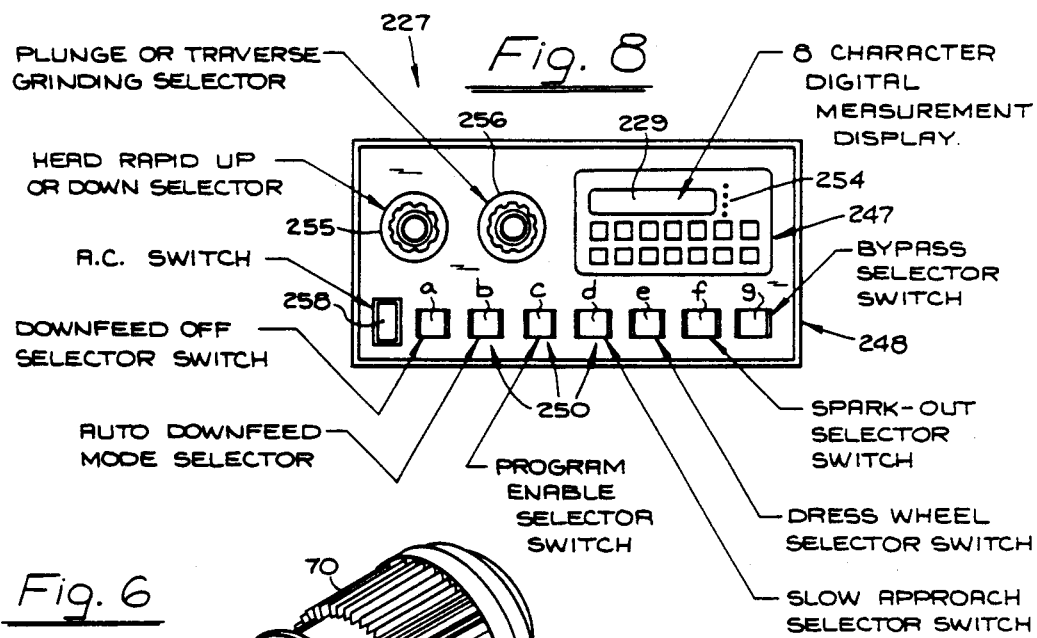
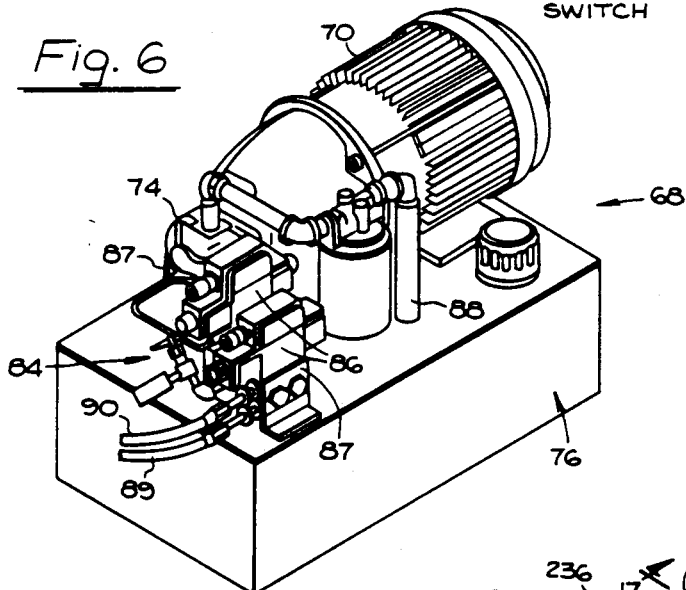
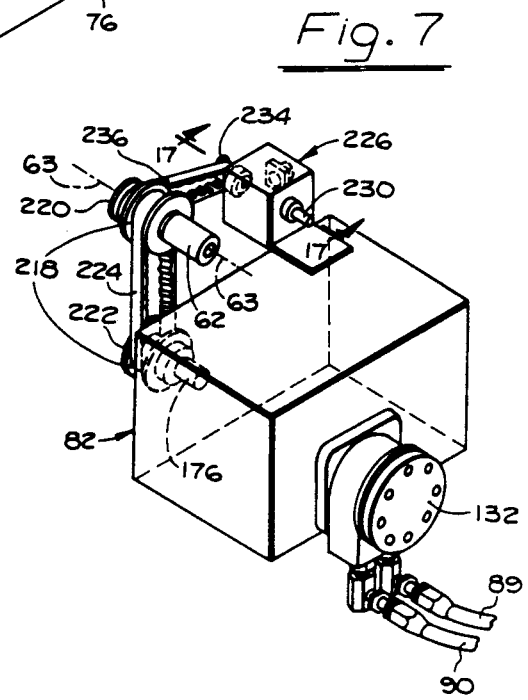

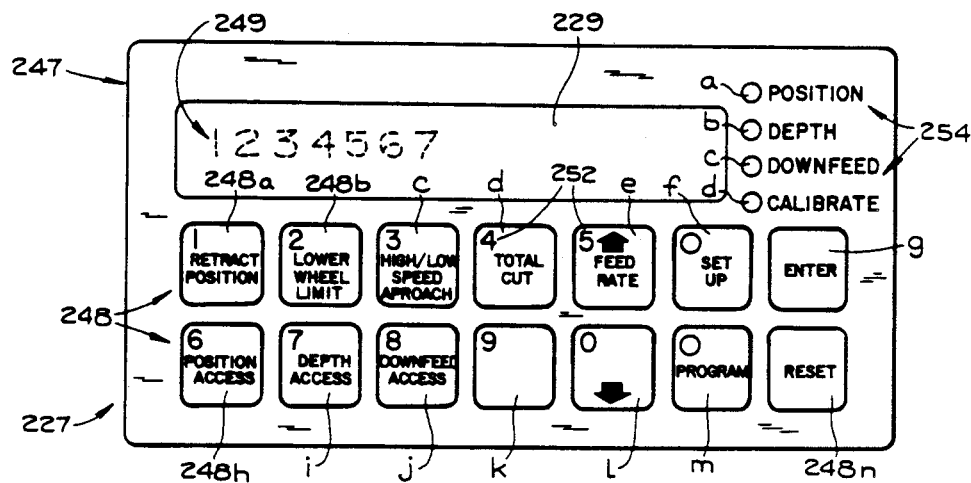
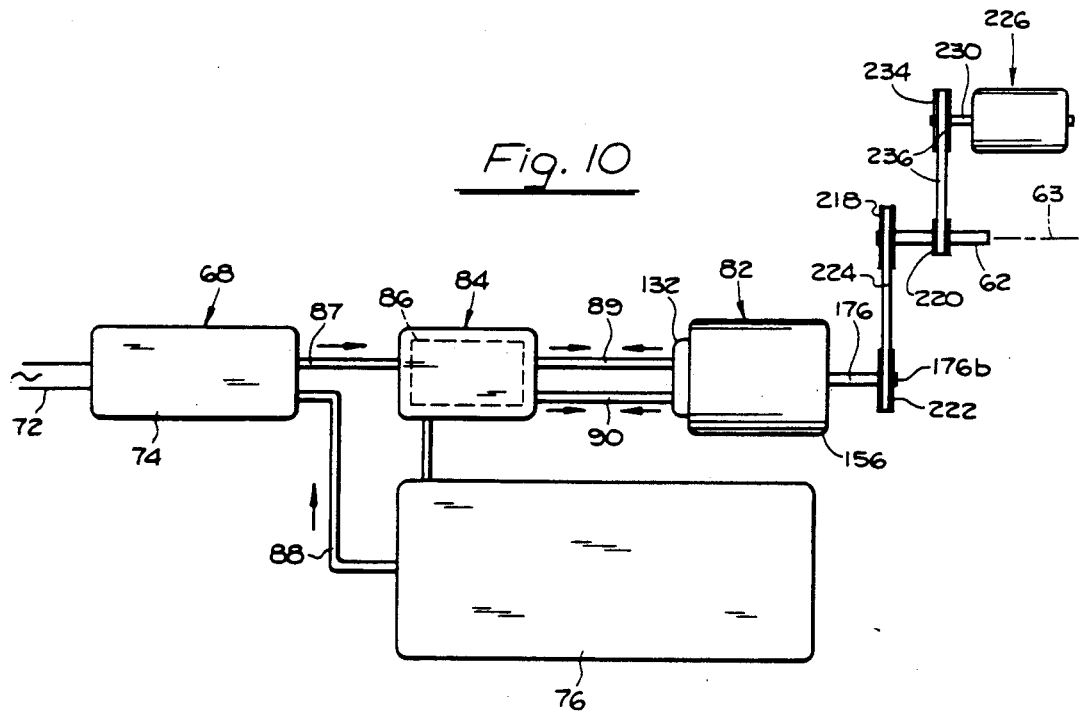

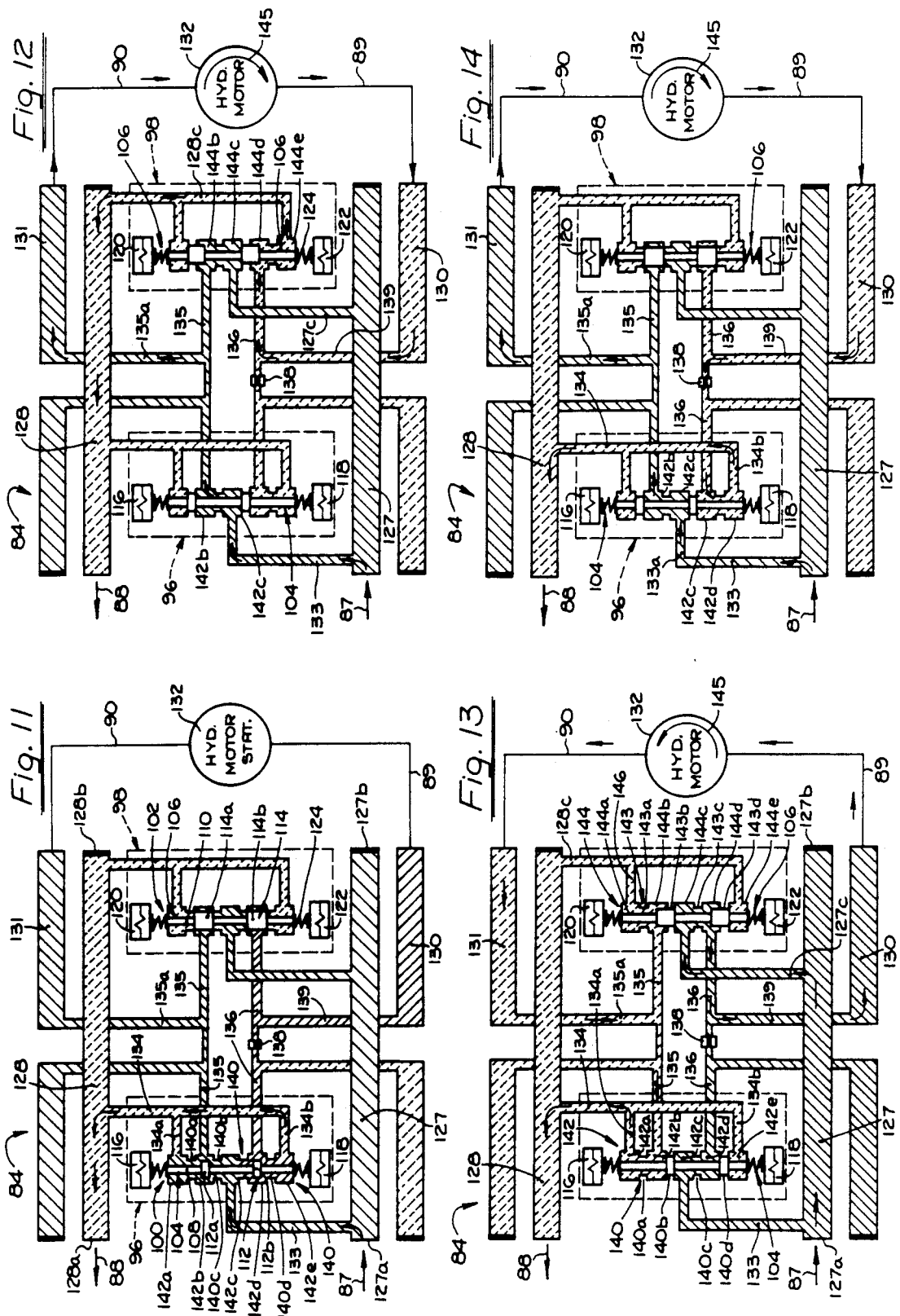

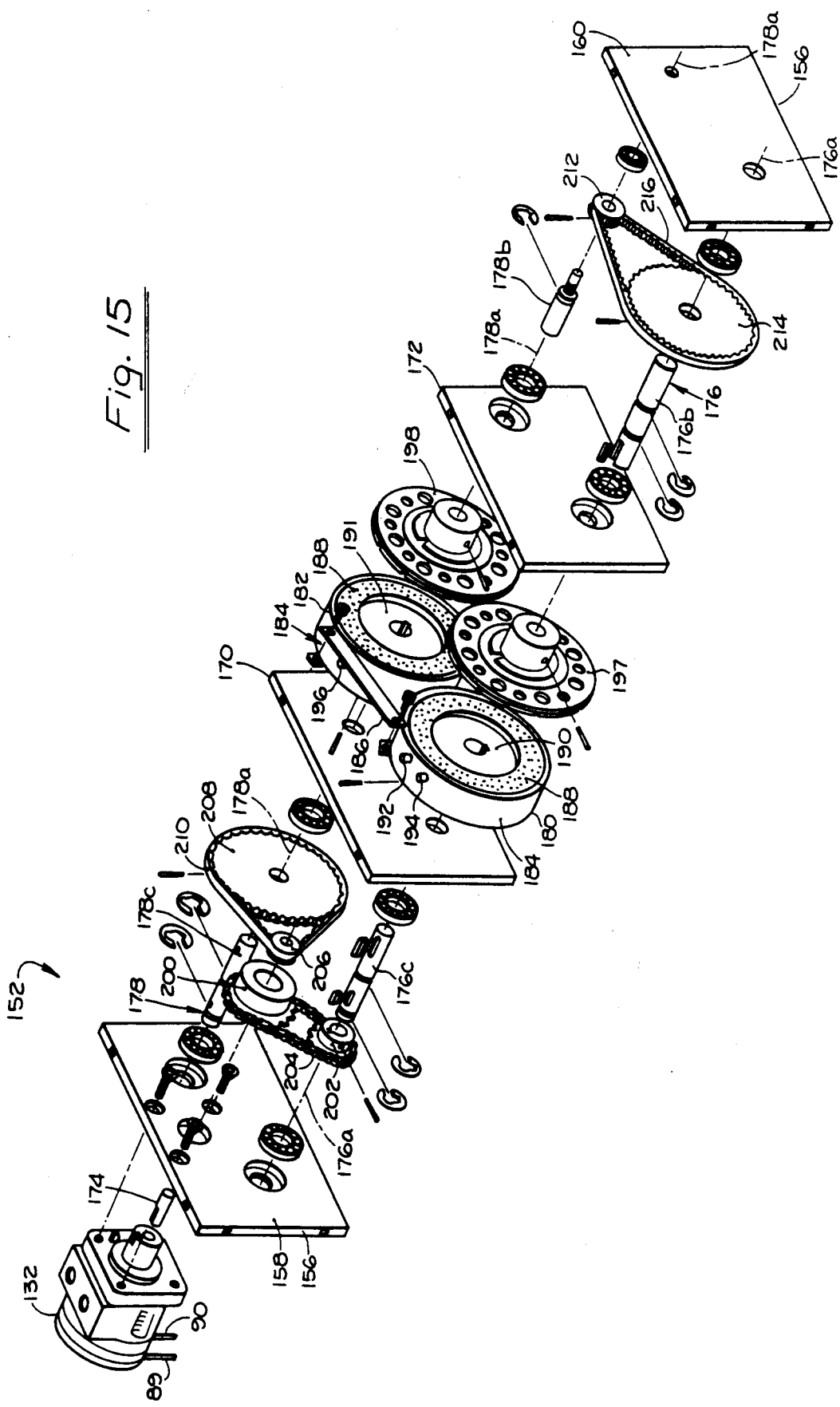

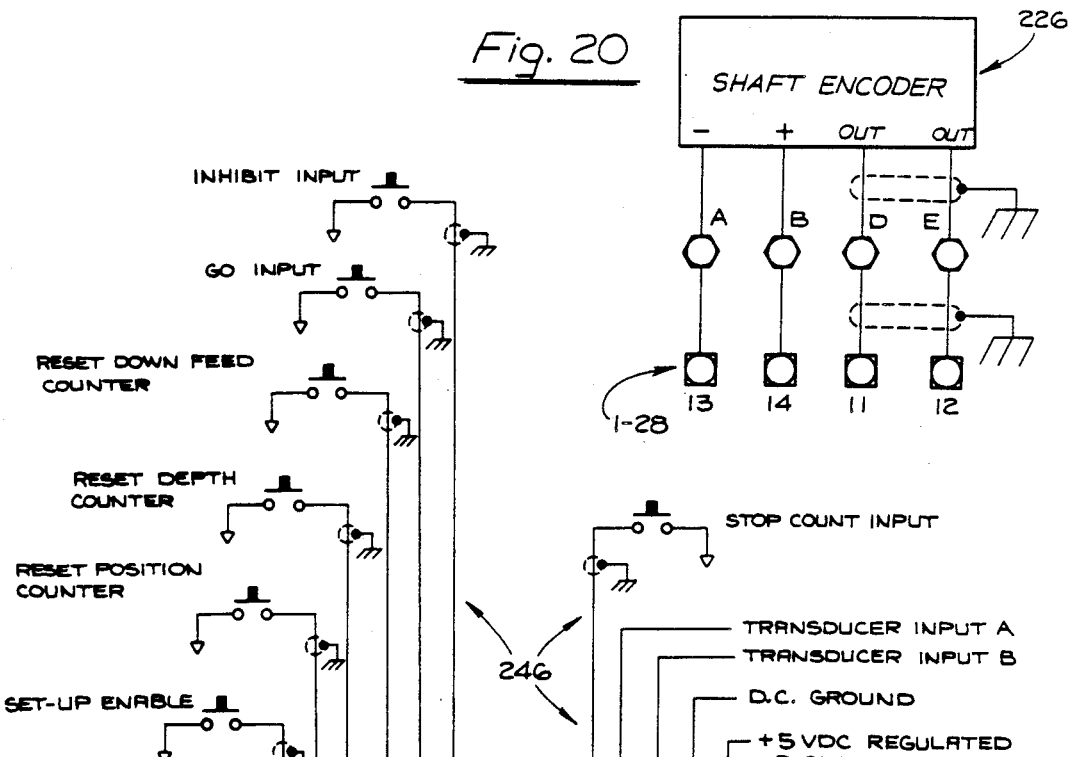
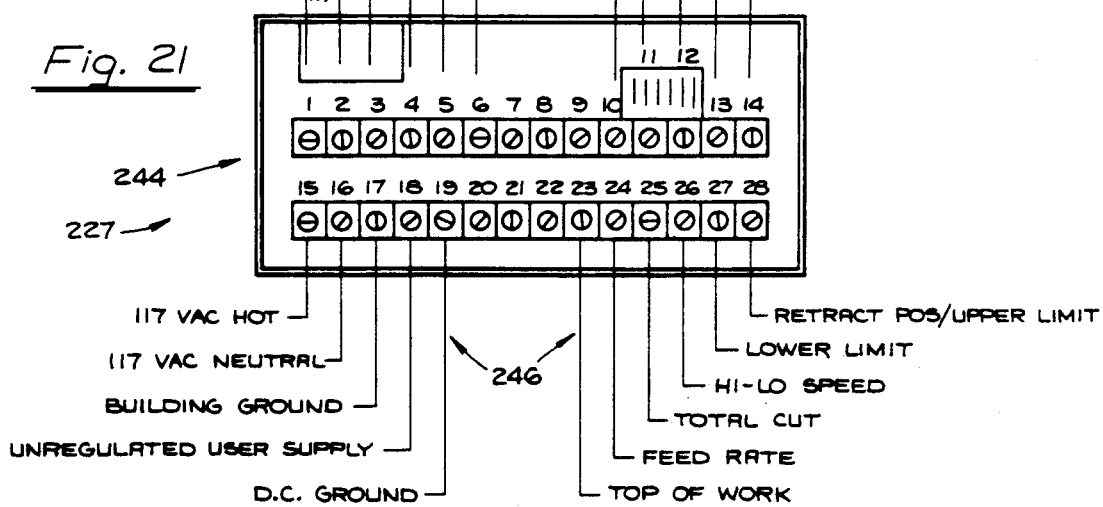

CONTROL MECHANISM FOR ADVANCING PARTS OF A MACHINE TOOL

FIELD OF THE INVENTION

The invention resides in the general field of controlling the moving parts of a machine tool. More particularly, the invention finds best utility in the case of a grinder, in controlling the movement of the grinding wheel thereof relative to the workpiece to be ground, in which the grinding wheel is a) moved rapidly toward and away from the workpiece, and b) moved slowly in advancing movements into engagement therewith and in further movements in the grinding step. Such a grinder includes a cross shaft for moving the grinding wheel.

BRIEF SUMMARY OF THE INVENTION

The invention provides a control apparatus for use in a grinder of the general character stated, having the following features and advantages:

1. It is a complete assembly capable of being retrofitted to a grinder, being connected directly to the cross shaft of the grinder, and thereby acting only through the cross shaft for controlling the grinding steps of the grinder, and except for manual control manipulations, being controlled only by the rotation of the cross shaft.

2. A single size such assembly can be applied to a grinder of substantially any size.

3. A motion transmitting means, for driving the cross shaft, is provided that is made up of hydraulic and mechanical units, that is of unusual effectiveness, providing a great range of speeds, from extremely fast, to extremely slow, and thereby capable of producing extremely fine increments of feed of the grinding wheel.

4. The motion transmitting means in addition to providing an extremely wide variation of speeds, does so to the exclusion of servo motors.

5. The motion transmitting means is capable of producing the fine increments of feed virtually without play.

6. The hydraulic unit accommodates the massive and heavy grinding heads of large grinders.

7. Unusual effectiveness is provided by the relationship between the hydraulic and mechanical units of the motion transmitting means, in which those units are arranged in tandem., the hydraulic unit drives the mechanical unit; reverse drive is provided by reversing the direction of flow of hydraulic fluid; and the direction of the output of the mechanical unit is determined solely by the direction of flow of the hydraulic fluid, to the exclusion of any shifting of gears or other manipulation in the mechanical unit.

8. The hydraulic unit provides for free flow of the fluid therein in fast feed, and in slow feed, at nearly zero pressure, with insignificant thermal expansion or contraction and corresponding maintenance of fine accuracy 9. An electronic encoder is provided, in the apparatus that is retrofitted to the grinder, that is driven directly by the cross shaft, in each direction, capable, in conJunction with an electric circuit provided in the apparatus, for preprogramming movements of the grinding wheel to different positions relative to a workpiece in the grinder to be worked on by the grinding wheel.

BRIEF DESCRIPTION OF THE VIEWS OF THE DRAWINGS

FIG. 1 is a perspective view of a grinder to which the apparatus of the present invention is applied.

FIG. 2 is a semi-diagrammatic view of certain elements of the grinder to which the apparatus is directly applied, this view being taken from the right side.

FIG. 3 is a view from the left of FIG. 2, showing those elements from the front.

FIG. 4 is a diagrammatic detail view of the table and related elements oriented according to FIG. 3.

FIG. 5 is a diagrammatic detail view of the table and related elements oriented according to FIG. 2.

FIG. 6 is a perspective view of a first main component of the apparatus, indicated by the arrow 6 in FIG. 1.

FIG. 7 is a perspective view of a second main component of the apparatus of the invention, indicated by the arrow 7 in FIG. 1 shown in dotted lines in the latter figure.

FIG. 8 is a face view of a third main component of the apparatus of the invention, indicated by the arrow 8 in FIG. 1.

FIG. 9 is a large scale face view of the upper right hand portion of FIG. 8 with certain inscriptions thereon.

FIG. 10 is a diagrammatic view, or flow sheet, of the components 6 and 7.

FIG. 11 is a semi-diagrammatic view of the hydraulic valves, in a first position.

FIG. 12 is a view similar to FIG. 11, but showing the valves in a second position.

FIG. 13 is a view similar to FIG. 11, but showing the valves in a third position.

FIG. 14 is a view similar lo FIG. 11, but showing the valves in a fourth position.

FIG. 15 is an exploded perspective view of the transmission incorporated in the component of Fig 8.

FIG. 20 is a detail of certain electrical elements of the encoder.

FIG. 21 shows the terminal plate and conductors of the counter.

FIG. 22 is a legend identifying certain terminals in the electrical circuit.

DETAILED DESCRIPTION

Figure 16:
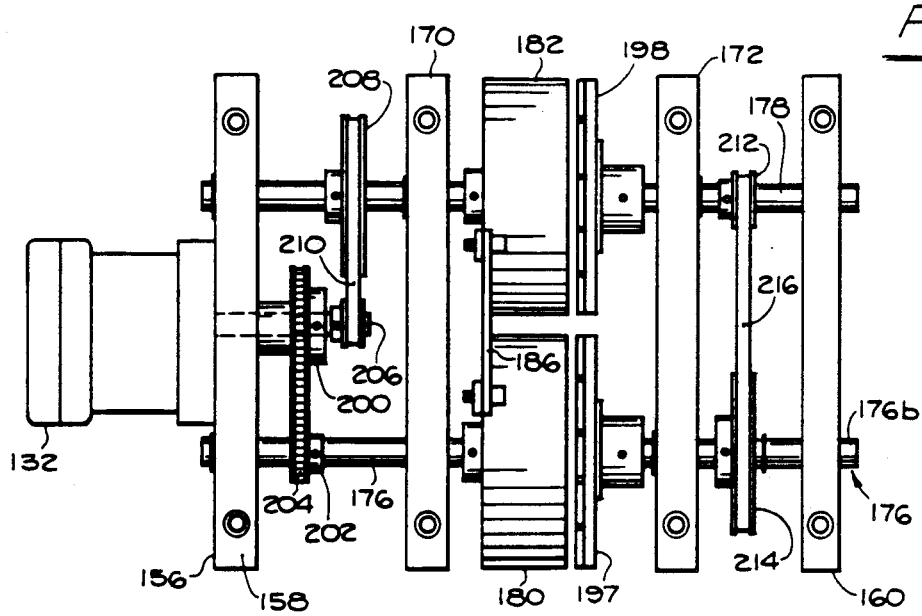
FIG. 16 is a top view of the transmission of FIG. 15, in assembled position.
Figure 17:
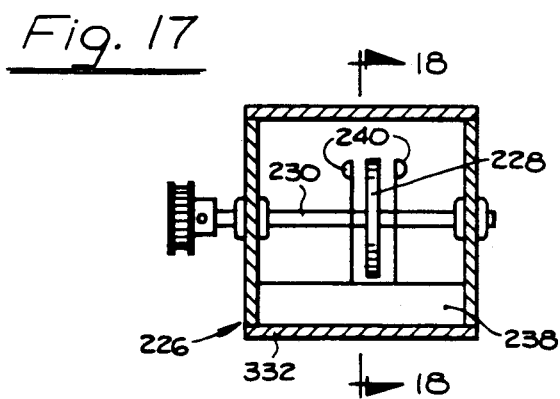
FIG. 17 is a semi-diagrammatic section view of the encoder, taken at line 17—17 of FIG. 7.
Figure 18:
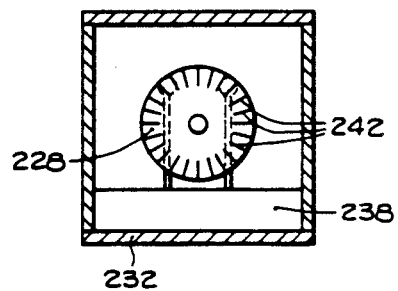
FIG. 18 is a view taken at line 18—18 of FIG. 17.

Mention is made of the use of reference numerals herein. These numerals 1-28 are applied to electronic counter terminals, the numerals 1'-16' to main terminals, and the letters A, B, D, E, to shaft encoder terminals. These may not be referred to individually, and all other elements referred to individually are identified with the numerals beginning with 30 and proceeding upwardly.

As noted above, the apparatus of the invention is adapted to be retrofitted to a grinder of known kind, and such a grinder is shown in FIG. 1, to which attention is first directed.

Attention is also directed to FIGS. 2 and 3, showing certain elements of the grinder, and particularly the grinding head, the movements of which are to be immediately controlled by the apparatus of the invention.

The grinder as a whole is indicated at 30 and includes a base or stand 32 and a column 34 adJacent the rear thereof. The grinder includes a table 36 on which the workpiece to be ground, indicated at 38, is placed, and held in place thereon by a magnetic chuck 39 having an upper surface 40. Usually the chuck is positioned on, and extends above, the supporting surface of the table, and actually supports the workpiece, and in referring to placing the workpiece on the table it is said to be placed on the chuck surface, and the chuck surface will be utilized herein in referring to positioning and dimensions.

Mounted in the column 34 is a grinding head 41 which includes a body 42 and a grinding wheel 44 the wheel being rotatable on an axis 46, the axis extending horizontally from front to rear.

The grinding head 41 is mounted in the column 34 for vertical movement for bringing the grinding wheel 44 downwardly into engagement with the workpiece, and upwardly in retracting direction.

The table 36 is reciprocable right/left longitudinally of the table, as indicated by the double-headed arrow 47, and is movable, or reciprocable, in/out, in directions transverse to the length of the table, as indicated by the double-headed arrow 48.

The rotation of the grinding wheel and the movements of the table 36 are effected by the components provided in the standard grinder, such as a hydraulic pump 49 (FIG. 1), and for example a hydraulic motor 50 (FIG. 4) directly driving the table in right/left directions and an electric motor, represented by a rack and pinion 51, directly driving it (FIG. 5) in in/out directions.

Figure 19:
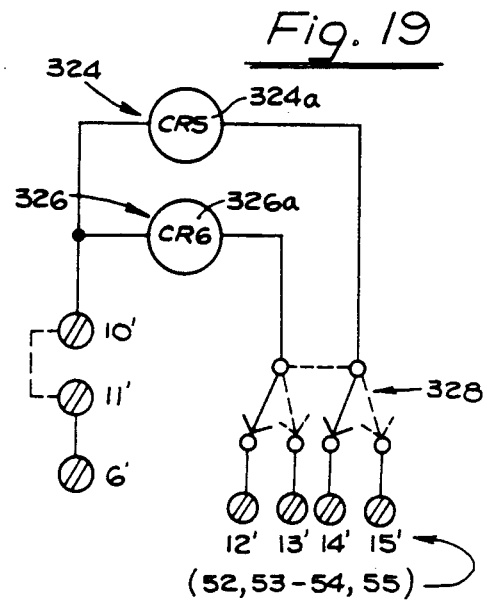
FIG. 19 is a portion of the circuit actuated by the table.
Figure 28:
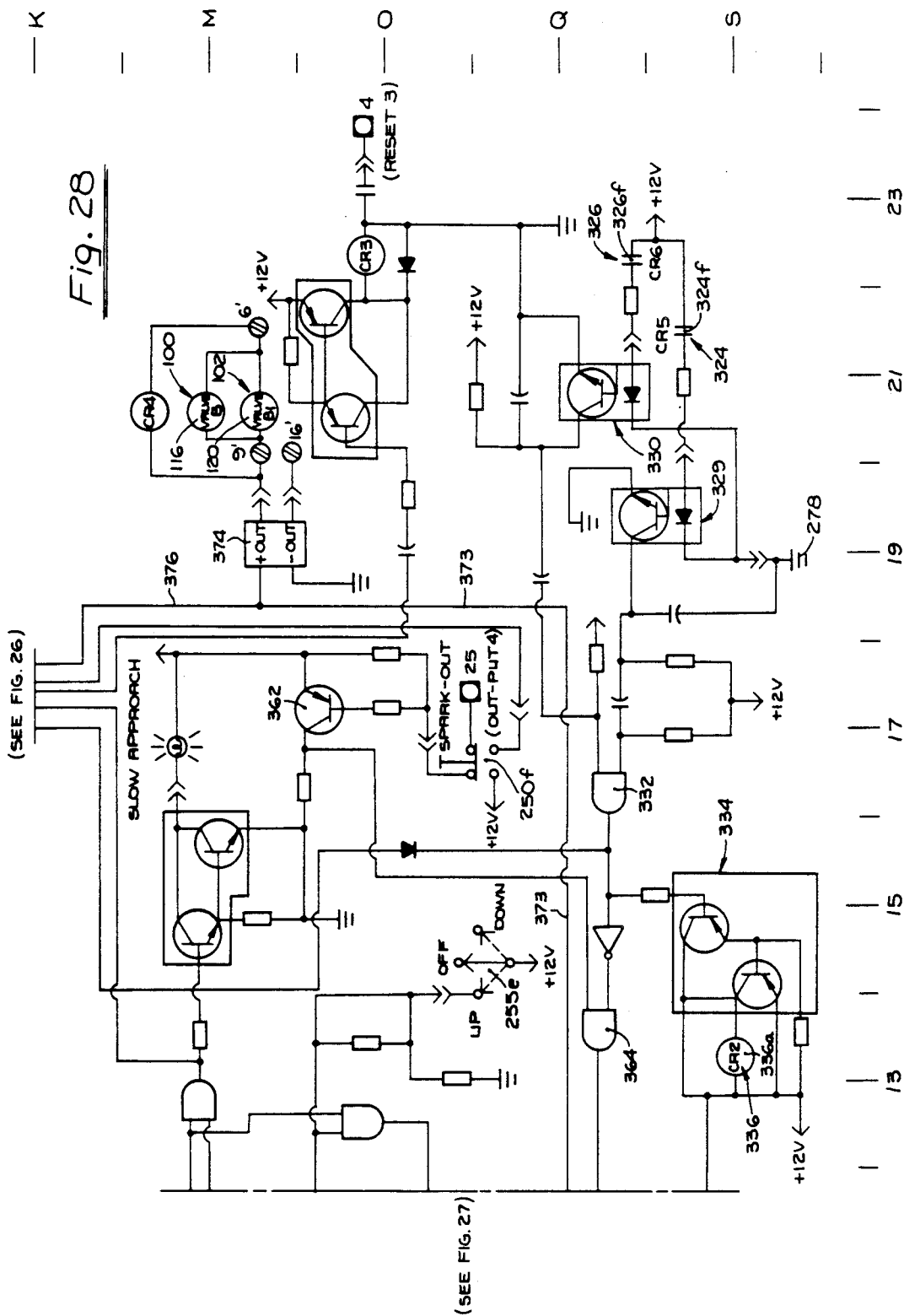
FIG. 28 is a diagram of a fourth portion of the electrical control circuit.

The reversing movements of the table are accomplished by known means in the grinder, which includes switches 52, 53, in the case of right/left movement, and switches 54, 55, in the case of in/out movements. Those switches are incorporated in the circuit herein, and are operable for activating relays, the coils of which are shown in FIG. 19, and the contacts in FIG. 28. The switches are put in circuit selectively according to whether the corresponding control steps are to be produced by the right/left or in/out movements of the table, as will be explained hereinbelow.

Two types of grinding are accommodated, i.e. (a) plunge grinding, and (b) surface grinding. In (a), the grinding wheel is lowered at each pass without in/out movement of the table, and a groove is cut in the workpiece of a width equal to the thickness of the grinding wheel. In this case, the switches 52, 53, are actuated by the table at each pass, and the grinding wheel fed down at each pass. In (b), the grinding wheel is held at a given height and passes are made successively while the table is moved in/out, until passes are made throughout the width of the workpiece, and following that movement, the corresponding switch 54 or 55 is actuated by the table, feeding down the grinding wheel.

The apparatus of the invention is concerned with bodily movements of the grinding wheel, from one location to another, as distinguished from rotation thereof, and unless otherwise indicated, references to movement of the grinding wheel hereinbelow will be to such bodily movement, and specifically controlling that movement of the grinding wheel into grinding engagement which the workpiece, and in other directions, and to other positions.

The apparatus is contained in three components shown in FIGS. 6-8 respectively, which are described in detail hereinbelow. Those components are positioned on or in the grinder as indicated in FIG. 1. The component of FIG. 6 may be mounted on the left hand side of the grinder, for example on the exterior, as indicated by the arrow 6. The component of FIG. 7 is conveniently placed in the interior of the stand 32 of the grinder, as indicated by the arrow 7 in FIG. 1, and the component of FIG. 8 may be placed in a convenient location on the exterior at the front, as indicated by the arrow 8 in FIG. 1. An advantage of the invention is here pointed out,—the components of FIGS. 6, 7, 8, are each adapted to be packaged individually whereby the apparatus can be easily delivered to a customer, and simply and easily applied to the grinder.

In grinders of this general type, as is well known, the grinding head 41 is mounted on a vertical lead screw 56 (FIGS. 2, 3), the axis of which is shown at 57, the grinding head being vertically movable, as noted above and as indicated by the double-headed arrow 58. Mounted on the lead screw is a worm gear 59 with which cooperates a worm 60 on the usual horizontal cross shaft 62, the cross shaft leading to the exterior at the front (FIG. 1) where a hand wheel 64 is mounted thereon, the axis of the cross shaft being indicated at 63. In initial steps in using the grinder, the operator may manually position the grinding head vertically, in a known manner, and attention is directed to the cross shaft because certain control elements of the present apparatus are directly connected thereto, for producing the intended control movements The cross shaft 62 is also shown in the upper right hand corner of FIG. 10, this figure showing the main components referred to above (not electrical) in relation to the cross shaft.

Referring to the broad concept of the invention, the apparatus includes means for driving the cross shaft, an electronic encoder driven by the cross shaft, and a counter including manually manipulatable control elements. An electrical circuit and an electronic circuit are included, the electrical circuit as used herein including the electronic circuit. As the cross shaft is rotated, and in response to control signals being entered in the electrical circuit, the encoder controls further rotation of the cross shaft FIGS. 25–28 showing the electrical control circuit are provided with coordinates at the margins thereof to facilitate designating locations of the various elements referred to, these coordinates being given in parenthesis following the references to the corresponding elements in the description thereof.

In the identification of relays main reference numerals are given to the relays as a whole, the same reference numerals being given to the coils and the contacts thereof with the addition of the postscripts a to the coils and the postscripts b, c, etc given to respective contacts.

The SCR's, transistors, rectifiers, triacs, diodes, and gates, may be referred to generically as valves.

The component shown in FIG. 6 is identified in its entirety at 68, and constitutes the source of the hydraulic drive for the apparatus of the invention, including an electrical motor 70 connected at 72 (FIG. 10) with a suitable electrical source. The motor drives a unidirectional hydraulic pump 74 which may be a gear pump, and a reservoir 76 is provided for the hydraulic fluid. The component 68, which may also be referred to as a pump unit, pumps the hydraulic fluid for driving the component of FIG. 7, now identified 82, which is also shown in FIG. 10. The flow of the hydraulic fluid is controlled by a manifold 84 in the component of FIG. 6, which includes a valve assembly 86 incorporating a set of valves, and a supporting structure 86. The valves themselves are shown in detail in Figs 11-14. Briefly, the manifold and a mechanical transmission unit in the unit 82 (shown in FIGS. 15, 16) constitute a motion transmitting means between the electric motor 70 and the cross shaft 62.

In the valve assembly 86, a closed hydraulic circuit is provided, including fluid lines 87, 88, (FIG. 6) between the pump 74 and the reservoir 76, and under the control of the valve assembly 84 In one mode, an idling mode, the fluid from the pump may be reversed in the valve assembly, and recirculated to the pump without any driving force. In other modes, or settings of the valves, the fluid is pumped through one of the additional lines 89, 90 (see also FIG. 10), to the unit 82 or transmission, and after driving the transmission, it is returned through the other of the lines 89 90 to the valves, and then through the recirculation circuit in return to the reservoir 76.

The hydraulic pump 70 is thus constantly operating but when the grinding wheel is in a desired position or setting, and not to be moved, this recirculation of the hydraulic fluid takes place. When the grinding wheel is to be moved the valves in the valve assembly 86 are actuated to direct the fluid through the manifold to the transmission for so moving the grinding wheel.

The valves in the assembly are arranged for selectively reversing the fluid flow to the mechanical transmission, and thereby reversing the direction of drive, and also are arranged for providing fast flow and slow flow, selectively, of the fluid to provide respectively fast and slow drive. It is pointed out that the mechanical transmission in the unit 82 also includes mechanical movements for establishing fast and slow movements therethrough, independently of the valves, as a result of which variation in speeds is provided as between fast movement through the valves and through the mechanical transmission, and slow movement through both of those components, selectively, as described in detail hereinbelow The fast movement can be provided in each of opposite directions The valves in the manifold 84 are electrically operated, under the control of the various elements of the control circuit of FIGS. 25-28.

Reference is now made to FIGS. 11-14, for a description of the valves in the assembly 86 and their operation. These figures diagrammatically show the interior of the valve assembly, so showing it as a system of passages as though lifted out of it, with valve members and operating solenoids, and the passages through the valve assembly controlled and determined by the relative positions of the valve members. The valve assembly includes a pair of valve units 96, 98, including valving passages 100, 102, respectively, each having ports therein. Although the valve units are shown in vertical position, they may assume other positions. The valve units include valve members 104, 106, made up of shafts 108, 110, respectively, and closer elements 112, 114, respectively, the latter in each valve member being further identified with postscripts a, b, individually, these closer elements being spaced apart on the individual shafts. These valve members 104, 106 are slidabe in the respective valving passages 100, 102, in a manner to be described hereinbelow FIGS. 11-14 are similar to each other, differing in the different positions of the valve members therein described in detail hereinbelow Also, in these figures, the reference numerals have not been applied to all the figures, to avoid congestion.

The valve members 104, 106, are actuated by solenoids individually identified 116, 118, 120, 122, these solenoids appearing in the control circuit (FIGS. 25-28), at (D-16), (M-21), (C-15), (N-21), and they are actuated as described hereinbelow in the description of the operation of the apparatus. At the present point it is stated that the solenoids upon being energized, and as oriented as illustrated, move the valve members 104, 106, as follows: solenoid 116 pushes the valve member 104 downwardly, solenoid 118 pushes it upwardly, solenoid 120 pushes the valve member 106 downwardly, and solenoid 122 pushes it upwardly. The positions to which the valve members are moved may be referred to as their actuated positions. It is pointed out that the valves are quick acting, under the action of the solenoids this point being of importance in affecting quick stopping of the grinding wheel and consequent fine control.

The valve unit 96 is normally OPEN, and the valve unit 98 is normally CLOSED, these normal positions being represented in FIG. 11 The valve members are separate from the solenoids, and the movements thereof referred to are relative to their normal positions When the solenoids are not energized, the valve members are biased toward and held in their normal positions by oppositely acting compression springs 124, and when the solenoids are energized, they act against the springs in actuating the valve members. The solenoids retain the valve members in actuated position constantly while the solenoids are energized.

The valve assembly 84 (FIG. 11) includes main passages 127, 128, having open ends 127a, 128a, connected with the hoses or hydraulic lines 87, 88, respectively, and their other ends 127b, 128b, closed or plugged as indicated The valve assembly also includes main passages 130, 131, connected respectively with the hoses or hydraulic lines 89, 90, leading to and from a hydraulic motor 132, of known kind, (FIGS. 7, 10, 15) incorporated in the unit 82 and serving to drive the rotating elements in that unit. The passage 127 includes branch 133 leading to the valving passage 100, and the passage 128 has a branch 134 leading to the valving passage 100, through branches 134a, 134b.

Other fluid passages include a branch 135 leading from valving passage 100 to the valving passage 102, this passage having a branch 135a leading to the passage 131 Another passage 136 leads from the valving passage 100 to the valving passage 102 and includes a restrictor member 138 therein. This restrictor member restricts the flow of the hydraulic fluid, and does so in the return line from the hydraulic motor 132, as will be referred to again hereinbelow. The branch passage 136 has a branch 139 leading to the main passage 130. In the operation of the apparatus, and n the driving modes, for driving the hydraulic motor 132, in selected directions, the hydraulic fluid passes from the corresponding Passages 130, 131, through the hoses or fluid lines 89, 90, to the hydraulic motor.

The valving passages 100, 102, include large ports and small ports, controlled by the valve members 104, 106, for respectively enabling full flow of fluid, and blocking the flow. These enabling and blocking functions directly control the speed of operation, and the direction thereof, of the hydraulic motor 132 The valving passage 100 includes a plurality of small ports 140, individually so identified with postscripts a, b, c, d, and a plurality of large ports 142, individually so identified with the postscripts a, b, c, d, e.

In a similar manner, the valving passage 102 includes a plurality of small ports 143, individually so identified with the postscripts a, b, c, d, and a plurality of large ports 144, individually so identified with the postscripts a, b, c, d, e.

The position of the valve assembly shown in FIG. 11 represents the inactive or NORMAL or idling mode in which no motion is being transmitted to the mechanical unit or transmission (FIG. 15) n this mode the hydraulic fluid from the hydraulic pump 74 is circulated in a CLOSED circuit from the pump through the valve system 84. It will be understood that when the valve closers 112, 114, are in the small ports, the fluid is blocked through the respective portions of the valving passages, but when they are in the large ports, the fluid freely flows through the corresponding portions of the valving passages.

In this mode (FIG. 11) in the valving passage 102, the closer elements 114 block the flow of fluid therethrough, because those elements are in or at the small ports, i.e. CLOSED position. In the valving passage 100, at the left, the closer elements 112 are in the large ports, all of the small ports are OPEN, and the fluid passes freely through that passage. Specifically, in the mode of FIG. 11, the fluid enters from the hydraulic line 87 to the main passage 127, the branch 133, and into the large port 142c; then into the large ports 142d, 142e, the branches 134b, 134a; and then through branch 134, and main passage 128, in return through the hose or fluid line 88 to the pump As this recirculation takes place, as Just described, since the valve passage 102 is CLOSED, any pressure of the fluid in the valve unit 96 is distributed to both passages 130, 131, evenly, and hence no motion is transmitted to the hydraulic motor, the motor therefore being stationary, as indicated. This distribution of that pressure is, in one direction, from the passage 136, branch 139 and main passage 130, and in the other direction, from the passage 135, passage 135a, to the main passage 131, resulting in equilibrium of pressure, as stated The valve assembly remains in such mode in any given position of the grinding wheel, but to move the wheel, and assuming as a starting point, the wheel is in a top (or retract) position, and it is desired to move it down toward and into proximity with the workpiece, it is so moved at a RAPID speed, as is desired and well known. This distance may be quite great relative to that in incremental feeds, such as 10-12-15 inches, etc. To provide this fast downward movement, the valve assembly is moved to the RAPID DOWN mode represented in FIG. 12. This mode is produced by energizing solenoids 118, 122, to raise both valve members 104, 106, and the fluid is forced through both valve passages 100, 102. In this mode the hydraulic fluid enters the main passage 127, and proceeds through branch 133, to the large port 142c, and then through large port 142b, branch 135, branch 135a, and main passage 31, to the fluid line 90 to the motor 132 The fluid also flows from the main passage 127, through passage 127c, large ports 144c, 144b, passage 135, and then the passage 135a, with the flow therein referred to, and main passage 131. In return from the motor, the fluid passes from the line 89 into the main passage 130, branches 139, 136, large ports 144d, 144e, branch 128c, to the main passage 128. It will be noted that this line of passages, in both directions. are clear of restrictions, and the fluid flows at a rapid rate. Although the passage containing the restrictor member 138 is open, any flow therein would be extremely minor, although in additive direction in this mode (FIG. 12) the hydraulic motor 132 is represented as rotating in a first direction (clockwise) as indicated by the arrow 145.

To retract the grinding wheel from the workpiece, to raise it at a RAPID rate, the valve assembly is put in the RAPID UP mode represented in FIG. 13, which is done by energizing the solenoid 116 to push the valve member 104 down, and energizing the solenoid 120 to push the valve member 106 down. In this mode, the fluid flows from the pump 74 into the passage 127, the passage 127c, large ports 144c, 144d, branch 136, branch 139, and main passage 130 to the hydraulic line 89, the motor 132, and in return through the hydraulic line 90. the main passage 131, the branch 135a, the branch 135, large ports 142b, 142a, branches 134a, 134, and main line 128, in return through the hydraulic line 88 to the pump 74. The fluid in return also flows from branch 135 through large ports 144b, 144a, branches 146, 128c to the main passage 128. In this mode, the motor 132 rotates in the second, or counterclockwise, direction, as indicated by the arrow 145.

When it is desired to advance the grinding wheel downwardly in small increments, to provide progressive grinding, the valve assembly in put into the DOWNFEED mode represented in FIG. 14, this being produced by energizing the solenoid 118 for pushing the valve member 104 upwardly, and leaving the valve member 106 in its normal closed position, i.e. with neither of the solenoids 120, 122, energized. The valve member 106 when in this position completely closes or blocks the valving passage 102 and thus the valve unit 98. In the control operation of the valve assembly in this mode, the restrictor member 138 comes into effect, and it is pointed out that it is in the return line of the fluid, as contrasted with the pressure line. In the operation in this mode, the fluid enters into the main passage 127, flows through the branch 133, through the large ports 142c, 142b, branches 135, 135a, and into the main passage 131, and then through the line 90 to the motor 132, and in return through the line 89 to the main passage 130. The fluid then contInues through the branch 139, and branch 136 which includes the restrictor member 138, and the fluid then continuing through the branch 136, the large ports 142c, 142d, branches 134b, 134, and the main return line 128. The motor 132 rotates, as indicated in this mode, in clockwise direction, which is the same as in the RAPID DOWN mode represented in Fig 12.

The pump 74 in addition to being unidirectional in operation is of uniform speed, and greater or lesser pressure is developed according to the load encountered. In the RAPID DOWN and RAPID UP movements, and consequent rapid flow of fluid, minimum pressure or resistance is encountered, which from a practical standpoint may be considered non-existent, but in the DOWNFEED mode, with the constriction control, greater resistance and pressure is encountered. The differences in high and low speeds provided in the valve system is very great, and similar variation of speed through the mechanical transmission is provided, as referred to below.

Reference is next made to the means for transmitting motion from the hydraulic unit 84 (FIG. 7) to the cross shaft 62 (FIG. 1). This means is constituted by a mechanical transmission unit 152 which is incorporated in the component 82 (FIG. 7) and shown in detail in FIGS. 15 and 16.

The mechanical unit of FIGS. 15, 16 is driven by the unit 84, and is selectively connected in and disconnected from the driving movement, and is selectively driven rapidly or slowly.

The component of FIG. 7 and the transmission unit 52 of FIGS. 15, 16 are oriented differently from that of FIG. 1, for convenience in illustrating various details, but various elements of these components are identified for convenience in coordinating the views.

The mechanical transmission unit 152 includes a casing or enclosing box 156 which, as oriented with the grinder according to FIG. 1, includes a front side defined by a plate 158, a rear side defined by a plate 160, a left side 162, a right side 164, a top 166, and a bottom 168. The transmission unit 152 as shown in FIG. 15 includes the front plate 158, and the rear plate 160, while the other elements of the casing are omitted for convenience. FIG. 15 also shows two intermediate plates 170, 72, that are incorporated in the casing 156, and serve to support certain elements of the transmission unit.

The hydraulic motor 132 includes an output shaft 174 which functions as the input shaft to the unit 152. The unit includes an output shaft 176 which directly drives the cross shaft 62 (FIGS. 7, 10).

The unit 152 includes a plurality of shafts, certain ones of which are made up of sections on a common axis, and for convenience, the axes of the various shafts are identified with the same reference numeral as the shafts, followed by the postscript a. The output shaft 176 is made up of sections 176b, 176c. The unit also includes a downfeed clutch shaft 178 made up of sections 178b, 178c. The shafts 176, 178, are not coaxial with the input shaft 174, but all are parallel.

The unit 152 includes two clutches, a rapid clutch 180 and a downfeed clutch 182. These clutches are essentially identical, and are controlled by the electrical circuit of FIGS. 25-28, and appear in that circuit at E-22, F-22, respectively. Each of these clutches includes a casing 184 fixedly mounted on the plate 170 which is fixed in the container 156, by suitable means such as indicated at 186. Within the casings 184 are rotors 188 carrying respective electromagnets 190, 191. The electromagnets are energized through conductors 192, 194, 196, (FIG. 15, center) which appear also in the circuit at E-22, D-22, F-22, respectively, the conductor 192 being common to the two clutches Also included are rotors 197, 98, slidable, and rotatably fixed on the shaft sections 176b, 178b. The specific operation and control of these clutches are described in detail hereinbelow, but in referring to FIGS. 15, 16, upon energization of the armatures, they draw up the rotors 197 and 198 and rotate them. The shaft sections 176c, 178c are constantly rotating when the unit is operating, and the clutches are operative for transmitting rotation between the respectively aligned shaft sections, when engaged, but when disengaged the shaft sections 176b, 178b, remain idle but they are free running.

Mounted on the input shaft 174 is a sprocket 200 which drives a sprocket 202 on the shaft section 176c through a chain or toothed drive belt 204. The sprocket 202 is smaller than the sprocket 200 for increased speed of the shaft 176. Also mounted on the input shaft 174 is small sprocket 206 which drives a large sprocket 208 mounted on the shaft section 178c, through a toothed belt 210.

On the shaft section 178b is a small sprocket 212 driving a large sprocket 214 on the output shaft section 176b by a toothed belt 216.

When no motion is to be transmitted through the unit, both clutches are disengaged. When rapid movement is desired, the clutch 180 is engaged, and then the motion is transmitted from the input shaft 174, sprocket 200, toothed belt 204, sprocket 202, shaft sections 176c, 176b, the latter forming the output shaft element.

When slow movement is desired, the clutch 180 is disengaged, and the clutch 182 is engaged, and in this condition, the sprocket 208, on the shaft section 178c is constantly rotated by the sprocket 206 on the input shaft 174, and this movement is transmitted to the shaft sections 178b. This rotation of the shaft section 178b is then transmitted through the sprocket 212, toothed belt 216, and sprocket 214, to the output shaft 176. The ratio between the sprockets 206-208, and 212-214, is enormous, and this ratio is cumulative, and therefore the reduction in speed from the input shaft 174 to the output shaft 176 is great.

This reduction in speed through the mechanical component 152 is cumulative with that achieved through the hydraulic component 84 and the two together provide an extremely great variation as between the output of the pump (74) and the output 176 of the mechanical transmission (FIG. 15) As a result, the increments of advance of the grinding wheel toward the workpiece being worked upon are extremely small; the various parts or elements in the present instance are pre-selected so as to provide increments as small as 0.000050'.

The output shaft 176 of the transmission unit, extends outwardly beyond the casing, as shown in FIGS. 16, 7, 10, and mounted on the section 176b thereof is a sprocket 222 on which is a belt 224 which is also trained on a sprocket 218 on the cross shaft 62. On the cross shaft is also a sprocket 220. These sprockets are mounted on the cross shaft in any suitable manner.

The encoder and counter as referred to above are of certain internal characteristics for performing certain functions in conjunction with the components described hereinabove and the circuit of FIGS. 17, 18, 20, 23, 25-28. The encoder is identified at 226 and is shown in FIGS. 7, 10, 17, 18, 20, and the counter 227 and shown in FIGS. 8, 9.

The encoder is known as Optical Incremental Shaft Position Encoder sold by Fork Standards, Inc., and the counter is known as Custom MWB Unit, Model 494, sold by Electronic Counters & Controls, Inc.

The encoder 226 (FIGS. 17, 18) and counter 227 (FIGS. 8, 9, 21) are shown mainly in diagrammatic form because it is believed not necessary to describe them in detail. Briefly, these components contain certain electronics elements that interact as between them and they have interconnection with the circuit of FIGS. 25-28

The encoder has a rotary disc 228 that is driven by the cross shaft 62, in both directions, and the encoder and counter indicate the position of the cross shaft as determined by the position of the grinding wheel which is also driven by the cross shaft. That position is shown in numerical form on a screen 229 in the counter.

The character of the encoder and counter are such that to operate them and set them up for control, the operator of the grinder manipulates certain control elements (Figs 8, 9), this step being effective for entering signals into the counter, and these signals correspond to the position of the cross shaft as indicated in the counter, and thereafter, when the cross shaft again reaches that position, a function is performed according to the signal entered, as will be explained fully hereinbelow.

The encoder 226 (FIGS. 1, 7) is preferably mounted directly on the container 156 of the unit 82, for convenience, and includes a suitable casing 232 (FIGS. 17, 18) in which is a rotary shaft 230, the disc 228 being mounted on that shaft For driving and operating the encoder 226, the shaft 230 is provided with a sprocket 234, and a belt 236 drivingly connects that sprocket with the sprocket 220 on the cross shaft.

The encoder 226 being so connected directly with the cross Shaft 62, s moved by, and simultaneously with, the latter, in all phases of operation and movements thereof. It is advanced, and reversed, in the corresponding movements of the cross shaft, and at corresponding speeds thereof; as described above, the cross shaft is rotated at various speeds and in opposite directions, selectively, and the encoder is driven correspondingly.

The encoder incorporates an electronic unit 238, which includes a pair of LED's/receptors 240 on each of opposite sides of the disc 228. The disc is transparent, or translucent to the passage of the light rays, and it is provided with a plurality of radial marks or score lines 242 at the periphery thereof, that upon rotation of the disc, pass through the rays. The number of such lines can be as desired according to functions desired, and in the present instance there are 500 lines on the disc, which may be in the neighborhood of one centimeter radius. Upon rotation of the disc, as each line 242 passes through the rays, a pulse is generated and it is transmitted to the counter 227 where a visual numerical signal is displayed on the screen 229, (FIG. 9) indicating the position of the cross shaft and thus of the grinding wheel.

The encoder 226 and counter 227 together may be considered as a control unit, and they include (FIGS. 20-22) certain shaft encoder terminals A, B, D, E, and electronic counter terminals 1-28 inclusive. Certain of these terminals appear in the circuits of FIGS. 23, 25-28. FIG. 21 shows a Panel 244 incorporated in the counter, which includes the shaft encoder terminals 1-28 inclusive. This figure also shows various inscriptions 246 related to the elements of the electrical circuit to which the terminals are connected. Various switches and control elements that are shown in the electrical circuit are also shown as manually actuated pushbuttons and control elements in FIGS. 8 and 9. FIG. 8 includes a panel 247 that is isolated in large scale in FIG. 9 together with inscriptions thereon identifying certain elements and functioning thereof. FIG. 8 includes pushbuttons 248 that are also shown in FIG. 9 with inscriptions thereon, and FIG. 8 includes additional pushbuttons 250 representing switches included in the electrical circuit of FIGS. 25-28. The pushbuttons 248 and 250 are individually identified with the postscripts a, b, c, etc. In the operation of the encoder and counter upon actuation in the counter, and these signals are thereupon operable later for affecting, through the circuit, control movements of the grinding wheel.

The counter 227 is of such internal function characteristics that in one mode, the pushbuttons are operable for entering a numerical number, or digital display, 249 in the screen 229 which can serve as a reference relative to which other signals may be entered. For producing this numerical reference, certain of the pushbuttons are actuated according to functions to be performed, and they may be so actuated in connection with a desired numerical reference number 249, and the designated function is then performed at any later time when that same reference number occurs. Signal lights 254, e.g. LED's, identify the numbers 249 that are displayed on the screen. They are individually identified with the postscripts a, b, c, d.

The counter 227 (Fig 8) includes additional manually actuated control elements 255, 256, 258.

The power circuit 266 (FIG. 23) includes the means for operating the clutches and operating the solenoids in the valves and relays, and other instrumentalities.

Figures 23, 24:
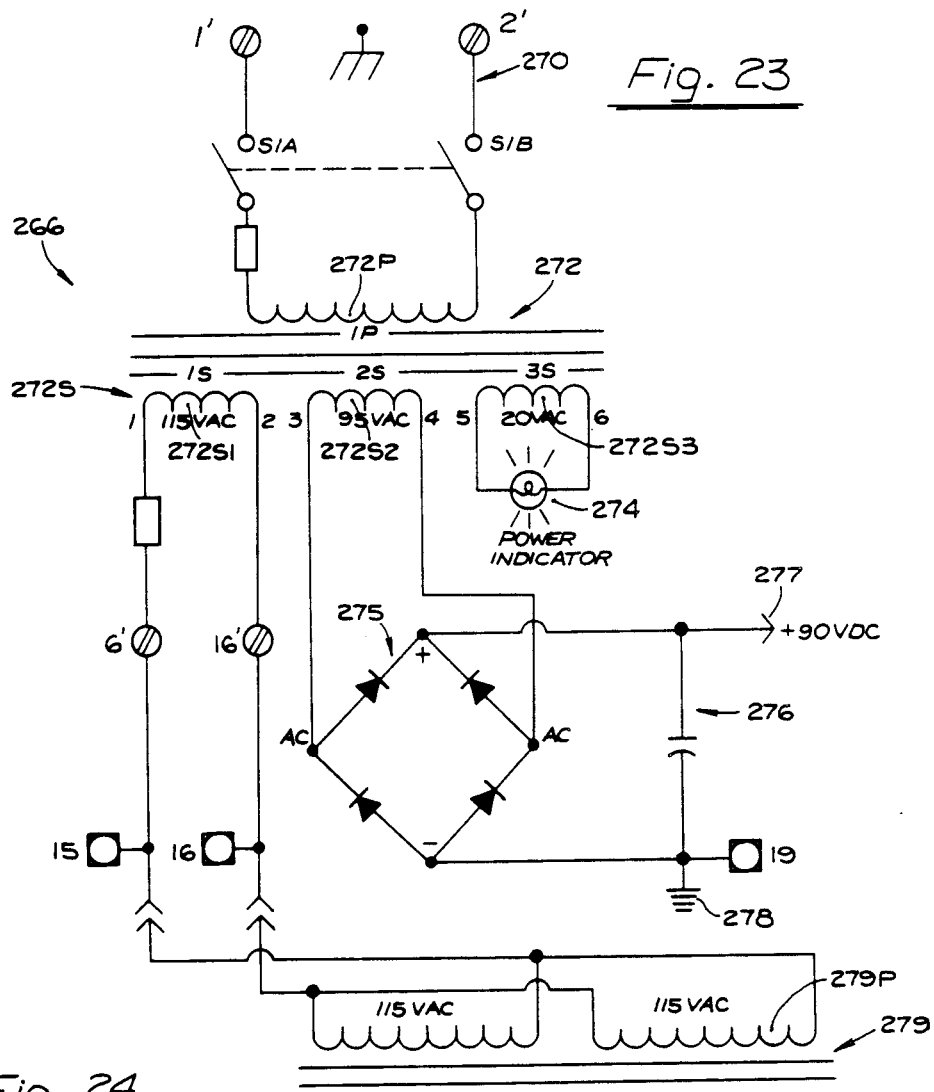
FIG. 23 is a diagram of the power circuit.
FIG. 24 is a layout of the positional relationship of FIGS. 25-28 showing portions of the electrical circuit.
Figure 25:
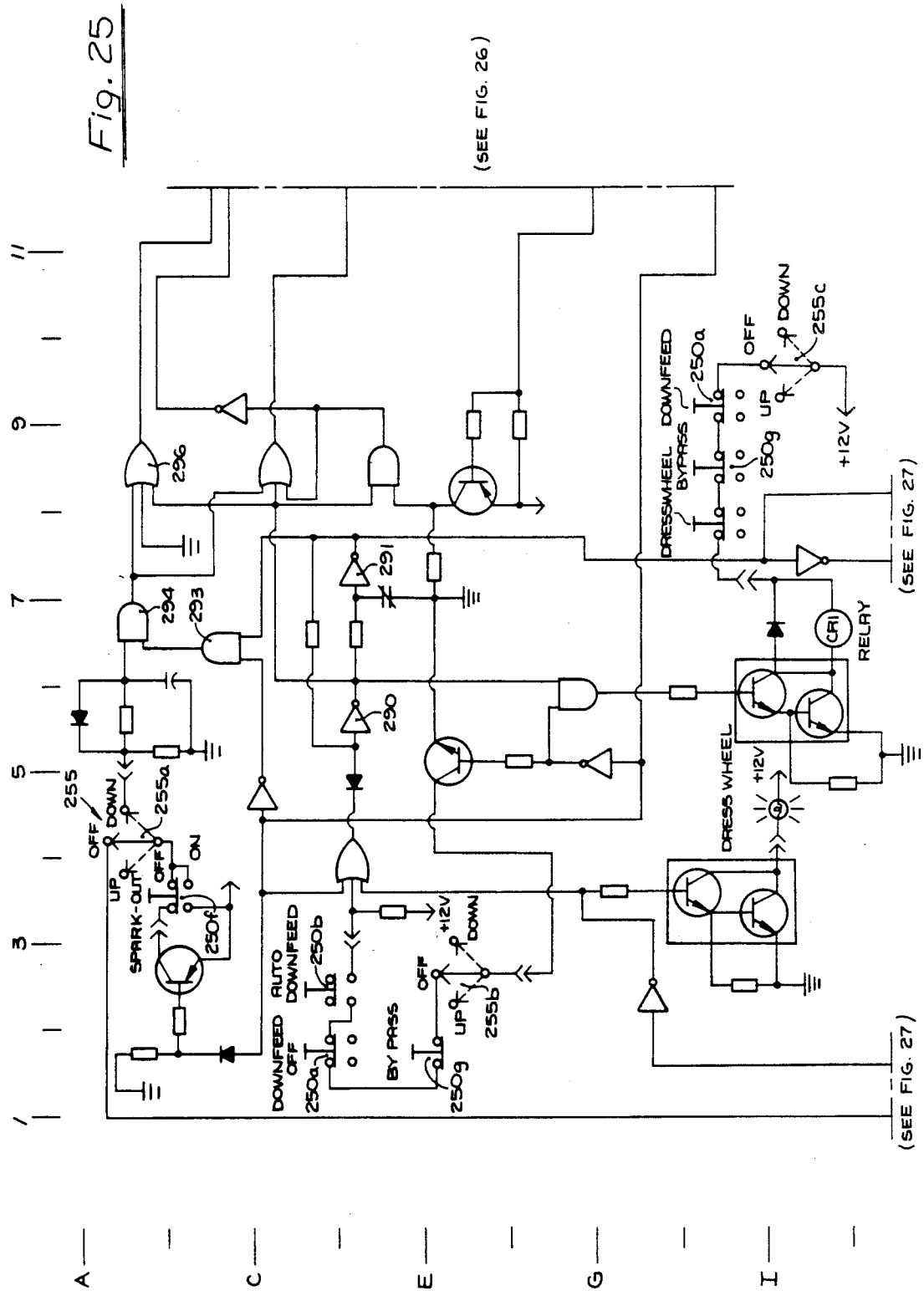
FIG. 25 is a diagram of a portion of the electrical control circuit.
Figure 26:
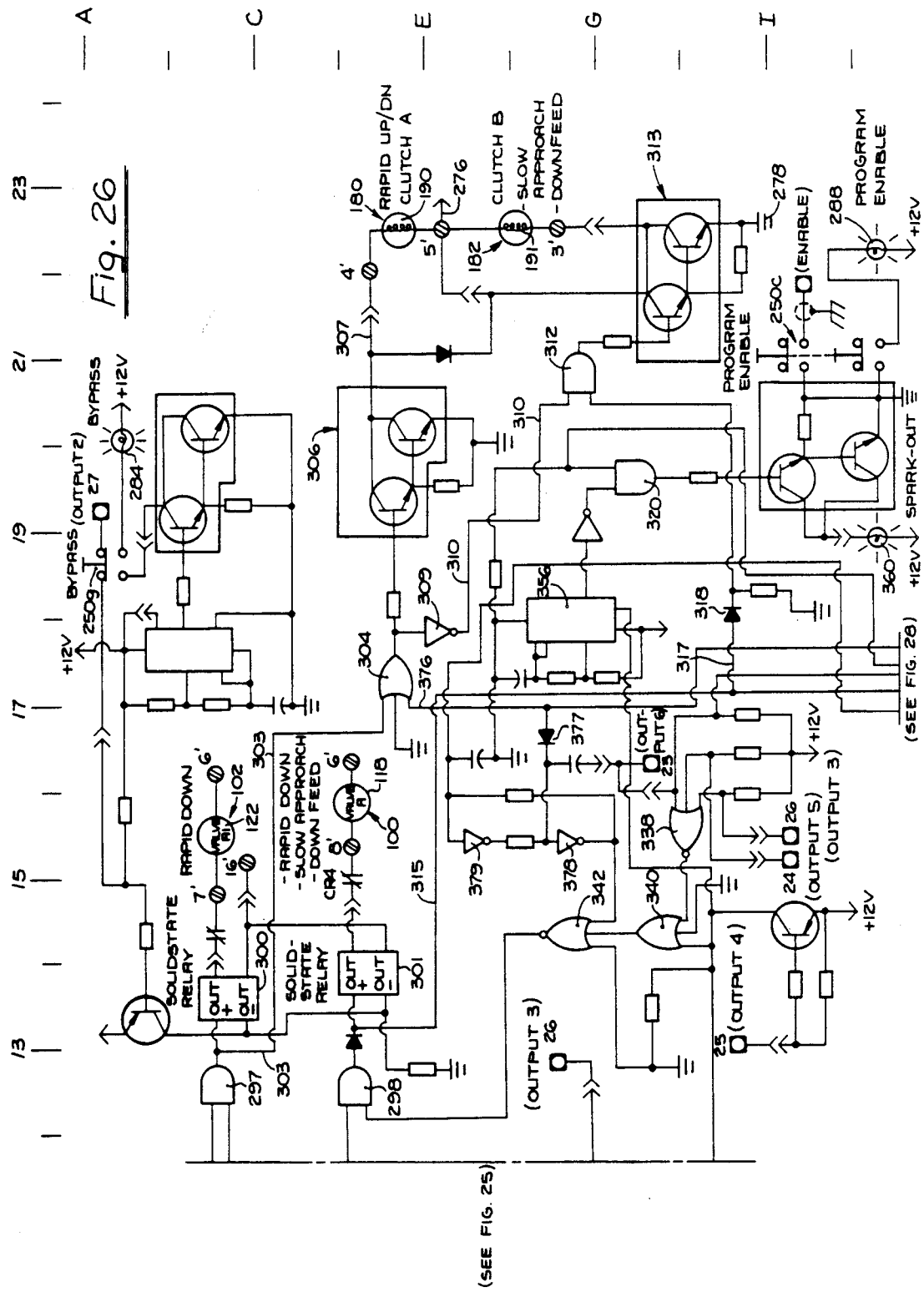
FIG. 26 is a diagram of a second portion of the electrical control circuit.
Figure 27:
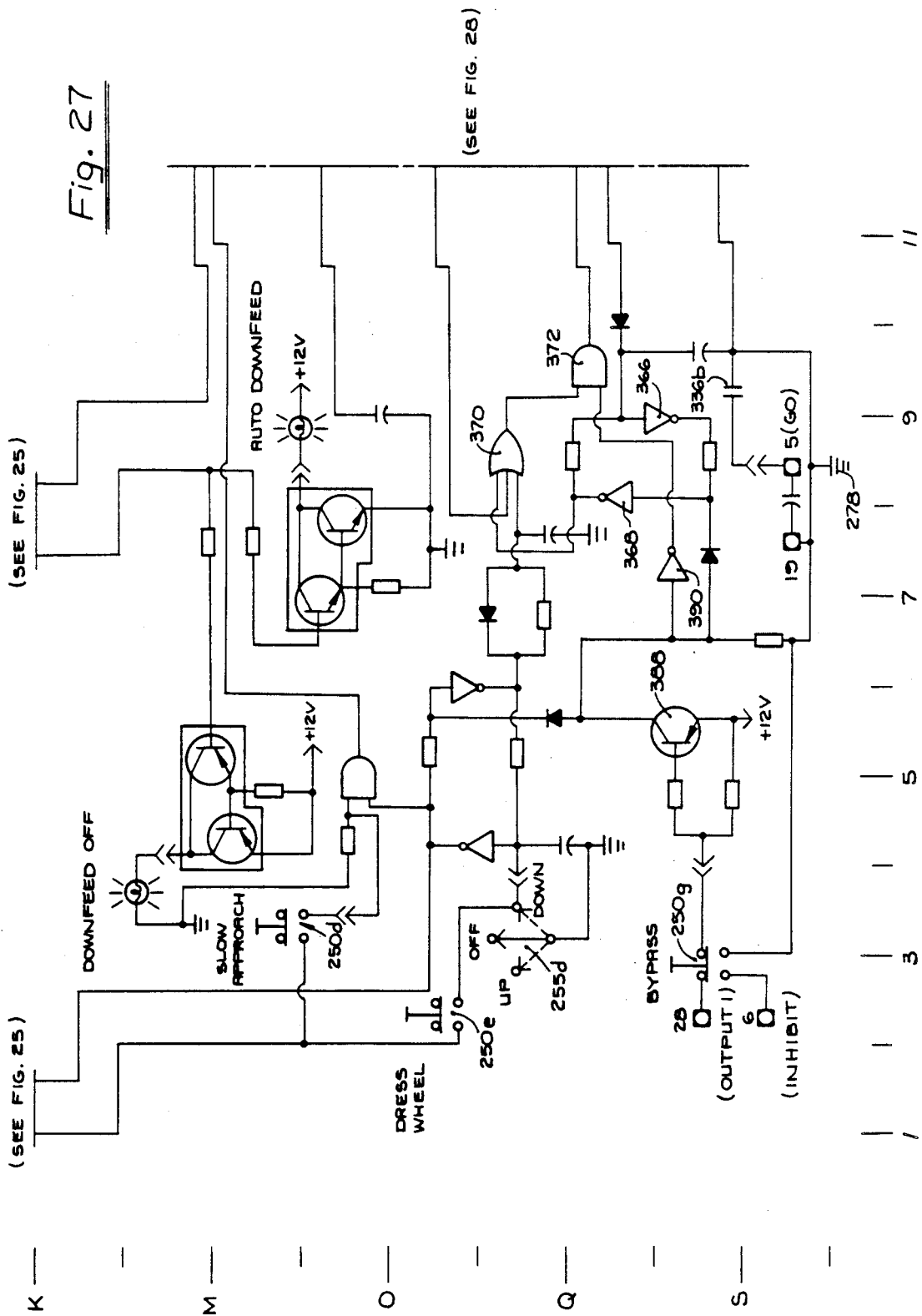
FIG. 27 is a diagram of a third portion of the electrical control circuit.

It includes a main power source 270 (230 VAC) leading to a transformer 272, having a primary 272P, a secondary 272S made up of three smaller secondaries 272S1, 272S2, 272S3. The secondary 272S3 leads to a lamp 274 serving as a power indicator; the secondary 272S2 leads to a rectifier 275, the output 276 of which includes a Jack 277 and a ground 278. The output 276 provides 90 VDC for operating the clutches 180, 182, (FIGS. 15, 16, and FIG. 26, E-23, F-23) and this jack is also shown in the control circuit (FIG. 26, E-23). The ground 278 which may be constituted by a common conductor, appears at various other places throughout FIGS. 25-28. FIG. 23 also includes certain ones of the counter terminals (1-28, FIG. 20) in this case identified individually as 15, 16, 19.

The circuit 266 of FIG. 23 includes a second transformer 279 having a primary 279P leading from the secondary 272S1, the latter in this case acting as a primary. The transformer 279 includes a secondary 279S which leads to a rectifier 280, the output 281 of which includes a 12 V output conductor 282, and the ground 278 referred to above. This output 281 provides the 12 V source required at various points in the circuit of FIGS. 25-28 at various locations in the latter.

The control circuit 268 (FIGS. 25-28) includes a number of the electronic counter terminals referred to, that are identified individually 1 to 28 (see also FIG. 21), and certain ones also containing other identifications, e.g. OUTPUT, serving as common terminals directly interconnecting this circuit with the counter 227. Various elements and components of this circuit will be referred to in the description of the operation hereinbelow.

At this point it is desired to set out a program of operation which includes certain steps in manipulating the buttons in the counter 227 (FIG. 9) and certain switches in the circuit of FIGS. 25-28 and shown also in FIG. 8. In this program, control elements involved may be found in various ones of the encoder, counter, and electrical circuits.

As indicated above, the lower position of the grinding wheel is that from which all other positions are calculated or measured. To enter in control signals, the operator actuates the elements, or pushbuttons 248, 250

(FIGS. 8, 9), and thereby control functions are performed in and by the encoder/counter in conjunction with the electrical circuits through the terminals identified.

As an example of a sequence of steps in operating the grinder, the following is an initial set-up program:

Press the ganged BYPASS switch 250g (E-2, R-3, A-19, I-9). The indicator lamp 284 (A-20) will flash.

Drive the grinding wheel down to its zero position, either manually or by depressing HIGH/LOW SPEED APPROACH button 248c.

Depress and hold PROGRAM ENABLE switch 250c (FIG. 8, I-21). The indicator lamp 288 (J-22) will flash. Press the RESET button 248n (FIG. 9) followed by pressing POSITION ACCESS button 248h. This resets the position counter which will then show "0.00000" on the screen 229, and which is the position of the grinding wheel. Then press LOWER WHEEL LIMIT button 248b. This is thereby entered as an active signal in the encoder/counter.

Drive the grinder wheel to nearly the upper limit accommodated by the machine, and then punch in the numbers shown in the display for RETRACT POSITION button 248a.

Place a workpiece on the chuck.

Drive the grinding wheel to the top of the workpiece.

Depress RESET button 248n followed by DEPTH ACCESS button 248i. This resets the depth counter.

Note the POSITION ACCESS number displayed and add 0.01300 to this number, and then program this total by depressing "HIGH/LOW SPEED APPROACH" button 248c To set the desired feed rate depress and hold PROGRAM ENABLE switch 250c (I-21), and depress PROGRAM button 248m followed by depressing the button 248 having the desired numerals 252 thereon, the corresponding number being programmed, and displayed. Then depress the ENTER button 248g, and then release the PROGRAM ENABLE switch 250c. After the feed rate is thus programmed, and it is desired to increase or decrease this rate, hold PROGRAM ENABLE switch in, and then hold the FEED RATE up key 248e or down key 248l switch the desired new feed rate is shown on the screen, and then release, and release the PROGRAM ENABLE switch.

Enter the total cut that is to be made, by depressing PROGRAM button 248m, and those of the buttons 248 a–e, h–l, having the corresponding digits 252.

Depress the BYPASS switch 250g (E-2) again, and the BYPASS indicator lamp 284 (A 20) will shut off.

Drive the grinding wheel to the RETRACT POSITION by switching selector switch 255 to UP position.

The lights 254 as referred to above, identify those of the numerical numbers 249 that are displayed in the above program.

The addition of the figure 0.01300 referred to above is utilized in expediting the crossover step. After the workpiece is placed on the table, in setting up the apparatus for operation, the grinding wheel is run down to what is determined by visual observation to be the top surface of the workpiece. This position is indicated in the digital display 249 (FIG. 9), and then the figure 0.01300 is added to that figure displayed Accordingly the crossover takes place at the position of the new position, eliminating the possibility of the wheel clashing with the workpiece due to inaccurate visual observation.

In view of the foregoing specific example of an operation sequence, it is believed not necessary to set out all the different operations in detail. The encoder 226 and counter can be programmed, according to known techniques for the desired programs of operation.

The following will serve as a summary of the manual control elements and corresponding functions involved. These elements are included in FIGS. 8 and 9 and the circuit of FIGS. 23, 25–28.

MAIN CONTROL OPERATION

HEAD SELECTOR SWITCH (UP-OFF-DOWN)(255 (B-4):
For bringing grinding wheel up or down at high speed.

SLOW APPROACH 250d (N-2):
Press this button to lower grinding wheel at slow speed.

AUTO DOWNFEED 250b (D-2):
For automatic grinding operations.

DOWNFEED OFF 250a (H-9, D-2):
Press this button to stop AUTO DOWNFEED

DRESS WHEEL 250e (O-1):
Press this button to bring grinding wheel to the RETRACT position during grinding operation to allow the operator to dress the wheel.

SPARK-OUT 250f (B-4, P-17):
Press in this button for SPARK-OUT grinding operation. When the programmed "total cut" has been made, the SPARK-OUT lamp will flash and the grinding wheel will make several passes without DOWNFEEDING. As soon as sparks disappear, raise the grinding wheel to the RETRACT position. This can be done in 3 ways:
 1. Turn off SPARK-OUT switch 250f (B-4, P-17). When table reverses direction, grinding wheel will automatically go UP.
 2. Press DRESS WHEEL button 250e (O-1).
 3. Place HEAD switch 255 (B-4) to UP position.

PROGRAM ENABLE 250a (I-21):
Press this button 250a (I-21) when resetting position counter and also during set-up and programming.

BYPASS 250g (R-3, A-19):
Press this button to override all programmed presets Turn off this switch and drive grinding wheel to RETRACT position to restore all programmed presets.

The following are steps that may be taken by the operator in various operating procedures.

KEYBOARD OPERATION

VIEWING THE COUNTERS

To view the Position Counter, press Position Access Key 248h.

To view the Depth Counter, press Depth Access Key 248i. To view the Downfeed Counter, press Downfeed Access Key 248j. The light or LED 254 to the right of the display will light up to identify the figure that is being displayed in the counter.

VIEWING THE PRESETS

To view RETRACT position preset, press Retract Position Key 248a. To view Lower Wheel Limit preset, press Lower Wheel Limit Key 248b. To view High/Low Speed Approach preset, press High/Low Speed Approach Key 248c. To view finished part size preset, press Total Cut Key 248d. To view feed rate preset, press Feed Rate Key 248e.

RESETTING THE COUNTER

To reset Position Counter 249 press and hold ENABLE button 250c (I-21), then Reset Key 248n followed by Position Access Key 248h. To reset Depth Counter 249, press Reset Key 248n, followed by Depth Access key 248i. To reset Downfeed Counter 249, press Reset Key 248n, followed by Downfeed Access Key 248j.

PROGRAMMING THE PRESETS

To program any Preset, press and hold PROGRAM ENABLE button 250c. Then press Program Key 248m, followed by a Preset Key, e.g. 248a (Retract Position).

Reference is now made to the specific operation of various portions of the electrical circuit that take place in conjunction with the program set out above In moving the grinding wheel down, the HEAD selector 255 (B-4) is actuated and the energized portion of the circuit continues to flip flop elements 290 (D-5), 291 (D-7), gates 293, 294 (C 9), gate 296 (D-9), gate 297 (C-13), gate 298 (D-13). This turns ON the SOLID STATE RELAYS 300 (C-13), 301 (D-14). The energized circuit thus reaches common main terminal 16' (C-15) (see also FIG. 23), and two main terminals 6' (C-16) (D-16) (see also FIG. 23); thus the circuit is energized through the solenoids 118a, 122a, of the valves 118, 122, (C-15) (E-16) (see also FIGS. 11-14). It will be noted that the valves are connected across the 115 VAC (FIG. 23).

In conJunction with actuating the valve solenoids 118a, 122a, the RAPID clutch 180 (E-23) (FIG. 15) is also engaged Continuing the energized circuit from gate 297 (C-13) a conductor 303 leads to a gate 304 (E 17), Darlington unit 306, then conductor 307 to the electromagnet 190 of the clutch It will be noted that main terminals 4', 5', are connected across the clutches, and leading from the terminal 5' is the 90 VDC source 276, identified above (FIG. 23).

Accordingly the solenoids 118a, 122a, are operated at RAPID FEED, and the clutch 180 is also being driven at RAPID FEED, for producing the RAPID DOWNFEED of the grinding wheel The circuit includes means for preventing the other clutch 182 (F-22) from being engaged when the clutch 180 (E-22) is engaged. For this purpose, an inverter 309 (E-18) is provided, a conductor 310 leading from the inverter to a gate 312 (G-21), preventing this gate from turning ON and thereby preventing the Darlington unit 313 from turning ON, this thereby preventing the clutch 182 (F-22) from being engaged.

In those modes other than DOWNFEED or grinding, it is desired that the grinding wheel be moved rapidly for efficiency, and is so moved in RAPID UP and RAPID DOWN. This rapid movement is accomplished by actuating both valve units 96 and 98, and in the RAPID DOWN movement, as the grinding wheel approaches the workpiece, a crossover takes place, and the grinding wheel is moved slowly into engagement with the workpiece and then is continued to be fed slowly in grinding, in a DOWNFEED mode. This is accomplished by shutting the valve unit 98, and engaging the clutch 180 and disengaging the clutch 182.

In this mode, the energized circuit includes the gate 298 (D-13), from which a conductor 315 leads to another conductor 317 in which is a diode 318, the conductor leading to gate 312 (G-21). This turns ON the Darlington unit 313, energizing the clutch 182 (F-23). This is the SLOW approach.

At this point in the operation, the table is reversed, by means of the built-in components in the grinder in response to the table engaging the switches 52-53 or 54-55 at the respective end of movement thereof (FIG. 4 or 5, FIG. 19). Also actuation of the switches by the table energizes relays 324, 326, the coils of which are shown in FIG. 19 and the contacts thereof, 324b, 326b, in FIG. 28 (R-22). Switch means 328 are provided in FIG. 19 to include the switches 52-53 or 54-55 selectively. The contacts 52-53 may be connected through terminals 13', 15', respectively and contacts 54-55 connected through terminals 12', 14', respectively. Thus, at each end of the movement of the table, downfeed of the grinding wheel is effected through control of the relay contacts 324b, 324c.

The relays 324, 326, are energized at the respective ends of movement of the table Regardless which set is utilized in the particular setting, upon energization of one of the relays, the circuit is energized (by contacts 324b or 326b, R-22) for advancing the grinding wheel in feeding direction, i.e. downwardly, and the energization of either one of the relays is significant in further control and actuation of the circuit.

Depending on which relay is energized, a unit 329 (S-19) 330 (R-21), is turned ON, enabling the gate 332 (R-16), turning on the Darlington unit 334 (S-15) and energizing relay 336 (S-13). The contacts 336b of that relay are found at S-9, and thereby a negative voltage is applied to counter terminal 5 (T-9). As pointed out above, this terminal is also found in the counter, and the counter functioning according to its internal characteristics, is advanced by the signal thus given.

At this step counter terminal 24 (H-15) is turned OFF. The signal proceeds through gate 338 (I-16), gate 340 (H-14), gate 342 (G-14), gate 298 (E-11), energizing solenoid 118 (D-16). At the same time the clutch 182 (F-22) is engaged, through gate 312 (G-21).

It will be noted that the circuit is completed through the relays at the main terminal 6' (C-16, E-16) which is shown in FIG. 19 and also in FIG. 23, the electric source being the transformer 272.

The feature involved here is the incremental DOWNFEED An increment of DOWNFEED is produced for removing an additional increment following a reversal of the table, following the presetting of the counter according to the increment of the material to be removed. This step in entering a signal into the counter is made possible by the relationship between the disc 228 with the lines 242 thereon, and the counter 227. When the table is again reversed, the subsequent control operation made by the relay 324 or 326 (FIG. 19, R-22) the step is repeated and at the end of that next increment, another OUTPUT signal is produced for feeding the grinding wheel down again.

The counter can be set anywhere in a wide range of dimensions, for example, at one position representing a thickness or increment 0.003" as a maximum, and in the present case, the proportions and relationships are such that an increment as small as 0.000050" can be provided, as set out above.

This procedure continues until the maximum dimension of the material to be removed is reached. According to the setting made in the counter, a signal is given at the end of the final cut through counter terminal 25 (I-13) OUTPUT 4.

At this step in the procedure the SPARK-OUT mode is reached. After the final cut is made from the workpiece, the table continues to move, in reversing directions, without advancement of the wheel. An advantage of this is that the operator can gauge the workpiece to determine whether the grinding should proceed, and if so, it can be continued without disturbing any previous settings.

In this SPARK-OUT mode, the timer 356 (G-18), which makes gate 32U (H-20) go HI and LO, causing the indicator lamp 360 (L-19) to go OFF and ON, this lamp being connected between the 12 V source (L-19) and ground (L-21).

If the SPARK-OUT mode is not selected, and when the grinding wheel reaches its end of movement in the final cut, and the table reverses, the counter terminal 25 (P-17) OUTPUT 4 turns ON. The signal then reaches transistor 362 (N-17), then gate 364 (R-14), then to inverter 366 (R-9), then inverter 368 (R-8), then gate 370 (Q-9), gate 372 (Q-10), turning ON the SOLID STATE RELAY 374 (N-19). When this relay turns ON, it energized valve solenoids 116 and 120 (N-21). Leading from this relay 374 is conductor 376 (M-18) which leads to conductor 376 identified above, and to the gate 304 (E-17). This then turns ON the Darlington unit 306 (E-20), engaging clutch 180 (E-22) which is RAPID UP (or DOWN), and in this setting, it moves UP. There is a diode 377 (G-17), controlling flip-flop 378 (G-15), 379 (F-15), which resets this flip-flop readying it for the next step. Upon the grinding wheel reaching its upper limit, all of the other outputs can be reset. In this UP position, the counter terminal 28 (S-2) is active, the signal then goes to transistor 388 (S-6), inverter 390 (R-7), gate 372 (Q-10), conductor 373 which puts reverse bias on SOLID STATE RELAY 374 (N-19), de-energizing the valve solenoids 116 and 120 (N-21), proceeding again, as mentioned above, to gate 304 (E-17). This turns off Darlington unit 306, disengaging the RAPID clutch 180 (E-23). The counter is designed so that when the grinding wheel reaches the top, in its upper limit, at counter terminal 28 (S-2) OUTPUT 1, then all previous settings are reset from the counter.

The different modes of the apparatus are provided by the interconnection pre-settings of the encoder 226 and the counter 227, and the circuit of FIGS. 25-28 includes the instrumentalities for carrying them into effect. In the functioning of the DRESS WHEEL mode, upon actuation of the switch 250e (FIG. 8, P-3) the grinding wheel is moved to its RETRACT position where it is accessible for dressing and in so moving it, and returning it to the operating position, none of the settings are disturbed.

The BYPASS mode is established by depressing pushbutton 250g (FIG. 8, E-2), which enables the operator to make a change in any of the settings previously made, such as depth of cut, etc. without disturbing any of the other pre-settings, and after such change, the BYPASS pushbutton is again actuated, returning the circuit to normal position. At this point, the operator must drive the head to the RETRACT position to restore all the pre-sets before he can proceed with the AUTO DOWN FEED grinding operation.

To set up the SPARK-OUT mode, the pushbutton 250f (FIG. 8, B-4) is depressed. In this mode, the DOWNFEED action ceases, and the grinding wheel remains at the level it occupied at that time, and a sparking action continues.

We claim:

1. In a grinder including a stand having a front and a rear side, a table mounted for reciprocation transversely of the stand, and from front to rear of the stand, the table being capable of supporting a workpiece thereon to be ground, a grinding wheel mounted on the stand for vertical movement between an upper limit retract position and a lower limit position adjacent the table a cross shaft operable on rotation thereof for moving the grinding wheel vertically, the combination comprising,
motion transmitting means including a hydraulic unit and a mechanical unit, the hydraulic unit including a hydraulic motor operably connected with the mechanical unit for driving the latter, and the mechanical unit having an output shaft constituting an output shaft of the motion transmitting means,
means for driving the motion transmitting means,
a first connecting means operably connecting the output shaft with the cross shaft for rotating the latter,
an encoder having a rotatable input shaft,
second connecting means operable connecting the cross shaft with said input shaft for rotating the latter,
a counter,
an electrical circuit,
the encoder being operable, in response to its rotation by the cross shaft for producing indications in the counter of the positions of the grinding wheel produced by rotation of the cross shaft,
manually acutable means for entering signal in the counter according to predetermined positions of the grinding wheel for pre-setting the counter to produce functions by the encoder according to later positioning of the grinding wheel at the respective position,
the hydraulic unit
including electrically operated valves for controlling flow of the hydraulic fluid and thereby controlling the movement of the mechanical unit, and
the encoder and electrical circuit being operable in response to preset signals entered into the counter for actuating the valves to open and closes positions.

2. A combination according to claim 1 wherein,
the hydraulic unit is capable of producing a fluid flow of predetermined full rate,
the valves include first elements operable respectively for enabling flow of said full rate, and restricting it to a lesser rate, and
the encoder and electrical circuit being operable for selectively actuating the valve elements.

3. A combination according to claim 2 wherein,
the valves include second elements operable selectively for producing a closed circuit flow of the fluid through the valves and blocking it from the hydraulic motor, and
directing the fluid through the hydraulic motor and then by driving the mechanical unit.

4. A combination according to claim 1 wherein,
the mechanical unit includes an input shaft operably connected with the hydraulic unit,
clutch means operably connected between the input shaft and the output shaft, and
electrical control means controlled by the encoder and the electrical circuit for operating the clutch means.

5. A combination according to claim 4 wherein, the mechanical unit includes a first and a second drive transmission shaft parallel with the input shaft and the second one of them incorporating the output shaft speed reduction means operably leading from the input shaft to said first shaft, speed reducing means operably leading from said first shaft to said second shaft, and electrically operated clutch means operably interposed between said drive transmission shafts 6. A combination according to claim 5 wherein, each drive transmission shaft includes axially aligned sections, and the clutch means includes a clutch in each drive transmission shaft operably interposed between the sections thereof 7. A combination according to claim 6 wherein, the mechanical unit has an anterior end and a posterior end relative to the direction of drive therethrough, the speed reducing means between the input shaft and the first drive transmission shaft is anterior to the clutch means, and the speed reducing means between the second drive transmission shaft is posterior to the clutch means.

8. A combination according to claim 7 wherein the mechanical unit includes a casing providing a fixed element, and wherein, the sections of each drive transmission shaft include an anterior section and a posterior section, each clutch including a casing mounted on said fixed element and an electromagnet in the casing and mounted on the respective anterior section for rotation therewith, and an armature mounted on the respective posterior shaft for rotation therewith, the clutches being normally disengaged, and being engaged when energized, the encoder and electrical circuit being operable for energizing the clutches selectively.

9. A combination according to claim 8 wherein, the anterior sections of the drive transmission shafts are connected for constant rotation, and the posterior sections thereof are idling when the clutches are disengaged.

10. A combination according to claim 7 wherein, each speed reducing means includes sprockets on the shafts, and toothed belts constantly trained on the sprockets.

11. A combination according to claim 7 wherein, the electrical circuit includes means for selectively energizing the clutches, and means preventing energizing both clutches simultaneously.

12. A combination according to claim 7 wherein, the input shaft is capable of being driven in either direction of rotation selectively, and the connecting means is operable for driving all the remaining shafts in the same respective predetermined directions in any selected direction of rotation of the input shaft.

13. A combination according to claim 8 wherein, in each clutch the electromagnet and armature have interengaging plane surfaces which provide the only drive interengagement through the clutch.

14. In a grinder including a stand having a front and a rear side, a table mounted for reciprocation transversely of the stand, and from front to rear of the stand the table being capable of supporting a workpiece thereon to be ground, a grinding wheel mounted on the stand for vertical movement between an upper limit retract position and a lower limit position adjacent the table a cross shaft operable on rotation thereof for moving the grinding wheel vertically, the combination comprising, an assembly of components capable of being retrofitted to a know grinder of the foregoing character, including, a motion transmitting means including a rotating output shaft, first connector means for connecting the cross shaft for rotating the latter, motor means for driving the motion transmitting means, an encoder including a rotating input shaft, second connector means operably for driving the encoder from the cross shaft, the connector means including pulleys mounted on the cross shaft and belt means interconnecting those pulleys and the motion transmitting means respectively, an electrical circuit operably connected between the encoder and the motion transmitting means, and the encoder in conjunction with the electrical circuit being capable of being pre-set for producing controlled movements of the motion transmitting means and thereby corresponding vertical movements of the grinding wheel.

15. A combination according to claim 14 wherein the grinder stand has an interior space through which the cross shaft extends, and wherein, the combination includes three main components, a first main component including an electric motor, a hydraulic pump, and a manifold itself including a set of valves, a second main component includes a mechanical motion transmitting unit, a hydraulic motor for driving it, and also includes the encoder, and is adapted to be mounted in said interior space, and the combination includes hydraulic lines operably interconnecting the hydraulic pump and hydraulic motor.

16. In combination according to claim 15 wherein, a third main component includes elements of the encoder and the electrical circuit, and has a display panel, and capable of being mounted on the grinder stand at the front thereof with the display panel presented to view of an operator at the front.

17. In a grinder including a stand having a front and a rear side, a table mounted for reciprocation transversely of the stand, and from front to rear of the stand, the table being capable of supporting a workpiece thereon to be ground, a grinding wheel mounted on the stand for vertical movement between an upper limit retract position and a lower limit position adjacent the table a cross shaft operable on rotation thereof for moving the grinding wheel vertically, an apparatus comprising, a driving component and a control component constituting self-contained units both, independently of each other, being capable of being connected with said cross shaft in an arrangement in which the cross shaft, upon rotation thereof, operates for so moving the grinding wheel in the same manner as set out hereinabove without the components being connected thereto, the apparatus including a pair of pulleys mounted on the cross shaft, including a first pulley for driving the cross shaft by the driving component and a second pulley for driving the control component by the cross shaft, a pair of connecting means for respectively driving connecting the driving component with the first pulley and the second pulley with the control component, and manually settable electrical means operably for predetermining actuation of the control component by the cross shaft, and consequently predeterminedly actuating the driving means and thereby actuating the cross shaft.

* * * * *